(12) United States Patent
Sourek et al.

(10) Patent No.: US 9,374,383 B2
(45) Date of Patent: Jun. 21, 2016

(54) EVENTS FROM NETWORK FLOWS

(71) Applicant: Cisco Technology, Inc., San Jose, CA (US)

(72) Inventors: Gustav Sourek, Nachod (CZ); Karel Bartos, Prague (CZ); Filip Zelezny, Prague (CZ); Tomas Pevny, Prague (CZ); Petr Somol, Marianske Lazne (CZ)

(73) Assignee: Cisco Technology, Inc., San Jose, CA (US)

( * ) Notice: Subject to any disclaimer, the term of this patent is extended or adjusted under 35 U.S.C. 154(b) by 38 days.

(21) Appl. No.: 14/519,160

(22) Filed: Oct. 21, 2014

(65) Prior Publication Data

US 2016/0112442 A1    Apr. 21, 2016

(51) Int. Cl.
*H04L 29/06* (2006.01)
*H04L 29/08* (2006.01)

(52) U.S. Cl.
CPC ............ *H04L 63/1416* (2013.01); *H04L 67/10* (2013.01)

(58) Field of Classification Search
USPC ......................................................... 723/23
See application file for complete search history.

(56) References Cited

U.S. PATENT DOCUMENTS

| 7,650,317 | B2 |  | 1/2010 | Basu et al. |
| 8,042,167 | B2 |  | 10/2011 | Fulp et al. |
| 8,555,383 | B1 | * | 10/2013 | Marshall ................. H04L 63/20 713/151 |
| 8,578,024 | B1 |  | 11/2013 | Keralapura et al. |
| 8,627,476 | B1 |  | 1/2014 | Satish et al. |
| 2003/0110398 | A1 |  | 6/2003 | Dacier et al. |
| 2007/0192863 | A1 | * | 8/2007 | Kapoor ................... G06F 9/505 726/23 |
| 2010/0162396 | A1 | * | 6/2010 | Liu ........................ G06F 21/566 726/23 |
| 2014/0013434 | A1 | * | 1/2014 | Ranum ................. H04L 63/145 726/24 |
| 2014/0280898 | A1 | * | 9/2014 | Voit ........................ H04L 61/00 709/224 |

OTHER PUBLICATIONS

Hu, Pan et al, "Generalizing from Example Clusters," Lecture Notes in Computer Science vol. 8140, 2013, pp. 64-78.
Rehak, Martin et al, "Adaptive Multiagent System for Network Traffic Monitoring," Intelligent Systems, IEEE , vol. 24, No. 3, pp. 16,25, May-Jun. 2009.
Song et al, "Adaptive Network Flow Clustering", Networking, Sensing and Control, 2007 IEEE International Conference on , vol., no., pp. 596,601, Apr. 15-17, 2007.
Rehak et al, "Camnep: An Intrusion Detection System for High-Speed Networks", Progress in Informatics, No. 5, pp. 65-74 (2008).

(Continued)

*Primary Examiner* — Jason Lee
(74) *Attorney, Agent, or Firm* — Samuel M. Katz

(57) ABSTRACT

In one embodiment, a system includes a processor to receive network flows, for each of one of a plurality of event-types, compare each one of the network flows to a flow-specific criteria of the one event-type to determine if the one network flow satisfies the flow-specific criteria, for each one of the event-types, for each one of the network flows satisfying the flow-specific criteria of the one event-type, assign the one network flow to a proto-event of the one-event type, test different combinations of the network flows assigned to the proto-event of the one event-type against aggregation criteria of the one event-type to determine if one combination of the network flows assigned to the proto-event of the one event-type satisfies the aggregation criteria for the one event-type and identifies an event of the one event-type from among the network flows of the proto-event. Related apparatus and methods are also described.

20 Claims, 6 Drawing Sheets

(56) References Cited

OTHER PUBLICATIONS

Canini et al, "Experience with High-Speed Automated Application-Identification for Network Management", In Proceedings of the 5th ACM/IEEE Symposium on Architectures for Networking and Communications Systems (ANCS '09). ACM, New York, NY, USA, pp. 209-218.

Vens et al, "First Order Random Forests with Complex Aggregates", Lecture Notes in Computer Science vol. 3194, 2004, pp. 323-340.

Zhang et al, "Network Traffic Classification using Correlation Information", Parallel and Distributed Systems, IEEE Transactions on , vol. 24, No. 1, pp. 104,117, Jan. 2013.

Galbrun et al, "Towards Finding Relational Redescriptions", Lecture Notes in Computer Science vol. 7569, 2012, pp. 52-66.

Ma et al, "Unexpected Means of Protocol Inference", Proc. Sixth ACM SIGCOMM, pp. 313-326, 2006.

\* cited by examiner

EVENTS FROM NETWORK FLOWS

TECHNICAL FIELD

The present disclosure relates to identifying events from network flows.

BACKGROUND

An intrusion detection system (IDS) analyzes network traffic data with the goal of revealing malicious activities and incidents. Before assessing maliciousness, the IDS constructs incidents and activities from as primitive information as individual traffic flows. The IDS then analyzes maliciousness based on the identified incidents and activities. Clustering flows to meaningful entities is an open problem. Existing solutions are trivial and sub-optimal in many ways, producing results that miss many a true network event or misinterpret the extracted information. The IDS can only effectively analyze maliciousness levels when solid categorization of the network events, activities and incidents is performed.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present invention, a system including a processor, and a memory to store data used by the processor, wherein the processor is operative to receive a plurality of network flows from a network, read, from the memory, a flow-specific criteria for each of a plurality of event-types, wherein for each one of the event-types, the flow-specific criteria of the one event-type is defined to identify if each of the network flows potentially forms part of some event of the one event-type when each one of the network flows is examined independently of all other ones of the network flows with respect to the flow-specific criteria of the one event-type, for each one of the event-types, compare each one of the network flows to the flow-specific criteria of the one event-type to determine if the one network flow satisfies the flow-specific criteria of the one event-type, for each one of the event-types, for each one of the network flows satisfying the flow-specific criteria of the one event-type, assign the one network flow to a proto-event of the one-event type, wherein the event-types includes a plurality of proto-events, each of the event-types including at least one proto-event, read, from the memory, an aggregation criteria for one of the event-types, wherein the aggregation criteria is defined to identify an event in the proto-event of the one event-type from at least some of the networks flows in the proto-event of the one event-type when the at least some network flows that form part of the proto-event of the one event-type are examined together as a group, and test different combinations of the network flows assigned to the proto-event of the one event-type against the aggregation criteria of the one event-type to determine if one of the different combinations of the network flows assigned to the proto-event of the one event-type satisfies the aggregation criteria for the one event-type and identifies an event of the one event-type from among the network flows of the proto-event.

Description Continued

Figure 1:
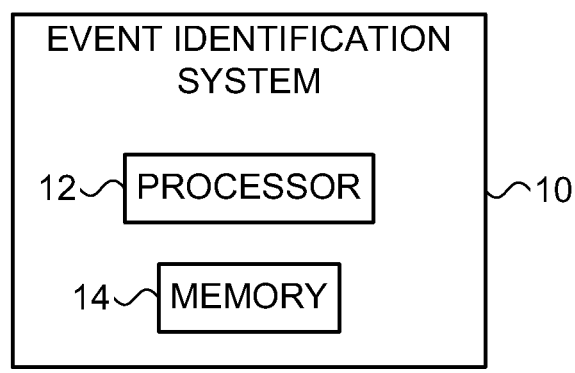
FIG. 1 is a block diagram view of an event identification system constructed and operative in accordance with an embodiment of the present invention.

Reference is now made to FIG. 1, which is a block diagram view of an event identification system 10 constructed and operative in accordance with an embodiment of the present invention.

The event identification system 10 includes a processor 12 and a memory 14 to store data used by the processor 10.

The event identification system 10 views network traffic as a sequence of network flows and groups the network flows that logically belong together, forming events. Examples of an event type are a vertical or horizontal scan, a command and control channel of one infected computer, or a distributed denial of service attack.

In packet switching networks, traffic flow, packet flow or network flow is a sequence of packets from a source computer to a destination, which may be another host, a multicast group, or a broadcast domain. RFC 2722 (Request for Comments 2722 of Internet Engineering Task Force) defines traffic flow as "an artificial logical equivalent to a call or connection". RFC 3697 defines traffic flow as a sequence of packets sent from a particular source to a particular unicast, anycast, or multicast destination that the source desires to label as a flow. A flow could include all packets in a specific transport connection or a media stream. However, a flow is not necessarily 1:1 mapped to a transport connection. Flow is also defined in RFC 3917 a set of Internet Protocol (IP) packets passing an observation point in the network during a certain time interval. A network flow may be a Cisco Netflow in accordance with a Cisco data standard. The Cisco Netflow is a tuple of: start time, duration, protocol, source-IP, source-Port, destination-IP, destination-port, flags, number of packets and number of bytes.

Intuitively, it should be possible to cluster the network flows according to source or destination IPs, or according to other information present in the network flow records. However, this kind of straightforward clustering as well as clustering based on observed network flow ordering typically leads to suboptimal results, with limited correspondence to real network events.

The following is an example of suboptimal results from clustering. As a simplistic example an incoming sequence of flows F1(source_C, destination_D, . . . ), F2(source_A, destination_D, . . . ), F3(source_C, destination_B, . . . ) could result in a cluster C(source_X, destination_D, . . . ), yet changing the order of flows to F1, F3, F2 could result in a cluster C(source_C, destination_X, . . . ). Similarly, suboptimal results could be obtained when clustering in accordance with other flow attributes.

In contrast to a clustering approach is explicit exploration of events, driven directly by event type definitions. Explicit exploration avoids the bias of the clustering approach by searching for all valid data instantiations among the network flows of a given event type definition, described by formula-based rules. A complete exploration of all events in a search for a particular event type, could theoretically be performed by scanning through all the possible subsets of network flows from an actual working 5 minute time-window, for example. Since the number of flows to consider in a given time scope can easily be in the millions, a complete exploration is probably not practical.

According to the inventors a factor to make an explicit exploration search work in an acceptable time frame is to provide bounds for the search process. The bounds for the search and the main idea of the event exploration are based on the fact that complexity arises not from the network flow data itself but from the event type definitions. That means it is much easier to look for certain event types, e.g. DNS tunnel, with simple definitions than other, more complex types of events, such as p2p traffic or DDOS attacks.

According to the inventors the criteria/formulae constituting event-type definitions may be divided to include two categories, according to the complexity of searching for the events (also termed "event-type instantiations" or "instances of an event-type") among the data flows.

The first category is referred to as flow-specific criteria and represents simple rules for identifying the network flows that may potentially be part of an event-type instantiation and may be applied in linear time according to the number of network flows. An attribute of the flow-specific criteria is that they are evaluated for each flow separately and hold true for all the flows in a particular event-type instantiation. The flow-specific criteria express constraints on various properties of a flow, such as defining the protocol, flags or limiting the number of bytes and packets.

The second category is referred to as aggregation criteria and represents various relations and aggregation functions. The search using the aggregation criteria may generally fall into the NP-complete category and rather than describing particular network flows the aggregation criteria express attributes of relations between the network flows and attributes of whole sets of flows. Examples of aggregation criteria include: limiting the minimal/maximal number of flows in an event; and limiting the average of bytes or entropy of ports. The aggregation criteria thus hold true for a whole event and cannot be evaluated separately for each network flow.

The search method is described in more detail with reference to FIGS. 2-6. In the meantime, the search method is described in overview below.

The search method is generally broken down into two main steps.

The first step is to compare each of the network flows with the flow-specific criteria for each event-type to determine if each network flow is potentially part of some event-type instantiation. It should be noted that each event-type may have one or more flow-specific criterion. For the sake of simplicity one or more flow-specific criterion is referred to as "flow-specific criteria" in the description and claims. If there is more than one flow-specific criterion for an event-type, the network flow being compared to the flow-specific criteria for that event-type needs to satisfy all the flow-specific criteria for that event-type to determine that the network flow is potentially part of an event for that event-type. Sub-groups of network flow data potentially part of event-type instantiations are created for each event-type instantiation. At this stage each sub-group may be termed "a proto-event" as the data in the sub-group provides an early stage, very broad, probably overly inclusive, possibly wrong definition of an event of that event-type. There may be one or more proto-events for each event-type, described in more detail with reference to FIGS. 2-4. By way of example, one network flow may be part of an SSH cracking event at a first node and assigned to a first proto-event of event-type A and another network flow may be part of an SSH cracking event at second node and assigned to a second proto-event of event-type A. Additionally, at this stage, some of the network flows may be identified as being potentially part of proto-events in more than one event-type resulting in some of the network flows being duplicated among the various proto-events, which can come naturally from non-distinctive definitions of event-types at this early stage. It may be possible that the network flows are not duplicated among the various proto-events depending on the type of network flows and the type of events being examined and the specificity of the flow-specific criteria. The sub-groups define a version space for later analysis against the aggregation criteria.

The second step applies the aggregation criteria on the proto-events from the version space. The idea here is that, although remaining in the NP-complete class, the search for the model of an event-type using the aggregation criteria is now performed on a much smaller data sub-set of network flows determined based on the flow-specific criteria. While searching for the model of an event-type (for a valid subset of network flows satisfying the given aggregation criteria), the event identification system 10 may still need to process through a data sub-set of thousands of flows in some cases. For that purpose, simple heuristics may be used to speed up the subset search at this stage. Examples of heuristics are described in more detail with reference to FIG. 5. It should be noted that each event-type may have one or more aggregation criterion. For the sake of simplicity one or more aggregation criterion is referred to as "aggregation criteria" in the description and claims. If there is more than one aggregation criterion for an event-type, the sub-set of network flows being compared to the aggregation criteria for that event-type needs to satisfy all the aggregation criteria for that event-type to identify an event of that event-type from the sub-set of network flows. It should also be noted that the two-stage process of the event identification system 10 does not require using deep packet inspection.

The processor 12 is operative to identify suspicious events based on applying the flow-specific criteria and the aggregation criteria for each of the respective event types.

The processor 12 is operative to output a report of the events identified from the network flows to an intrusion detection system (IDS) or an output device, by way of example only.

Figure 2:
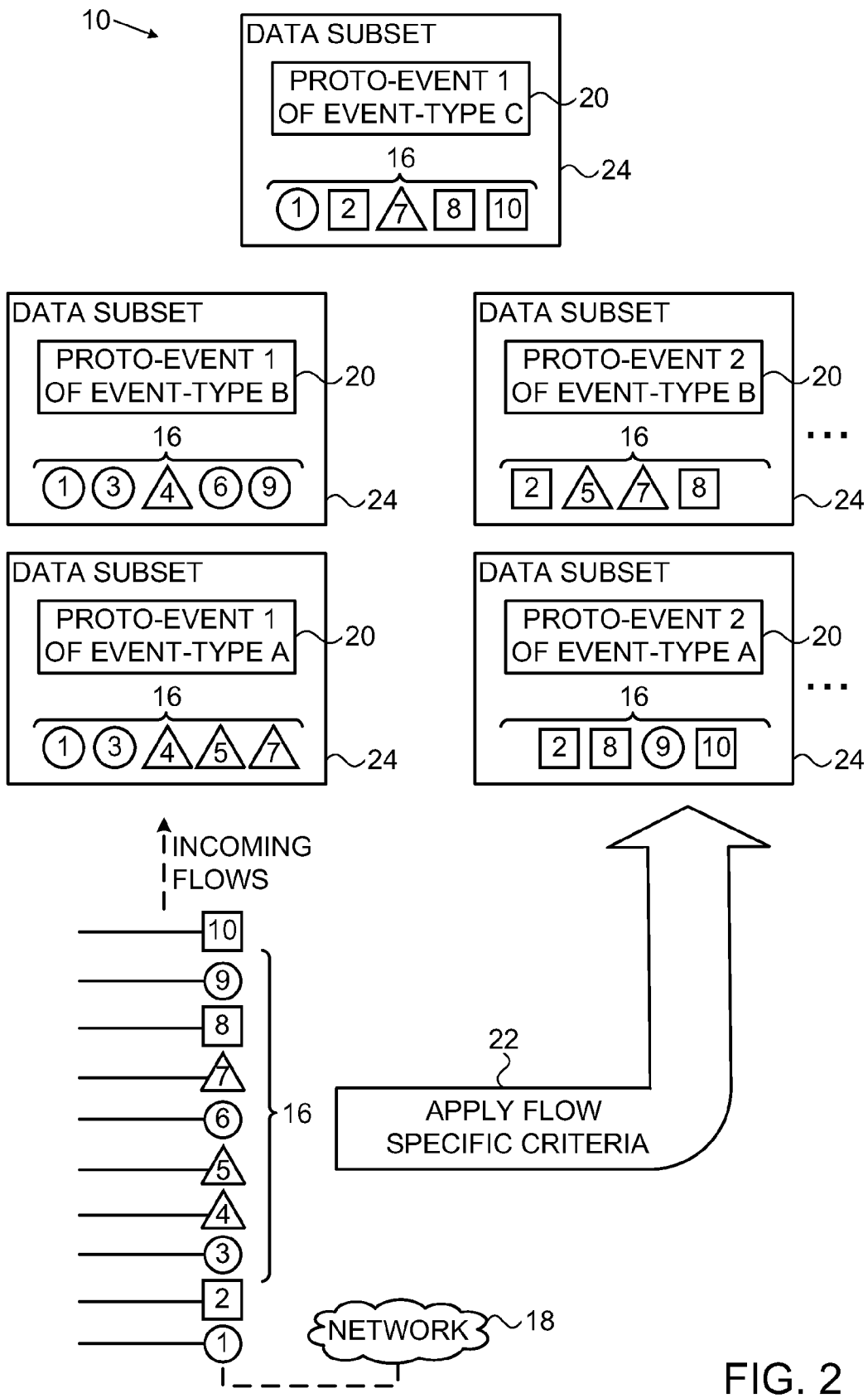
FIG. 2 is a partly pictorial, partly block diagram view showing application of flow-specific criteria in the system of FIG. 1.

Reference is now made to FIG. 2, which is a partly pictorial, partly block diagram view showing application of flow-specific criteria in the system 10 of FIG. 1.

The event identification system 10 (FIG. 10) is operative to receive a plurality of network flows 16 from a network 18. Each network flow 16 may, or may not, form part of an event. The event identification system 10 typically examines a certain window of the network flows 16. The window may be any suitable size, but typically depends on the size of network and the traffic load and could be in the range of minutes to hours, by way of example only.

FIG. 2 shows incoming network flows 16 (labeled 1, 2, 3, 4, 5, 6, 7, 8, 9 and 10). The network flows 16 labeled 1, 3, 6, and 9 form part of one event indicated by the flow number being included in a circle. The network flows 16 labeled 4, 5 and 7 form part of another event indicated by the flow number being included in a triangle. The network flows 16 labeled 2, 8 and 10 form part of another event indicated by the flow number being includes in a rectangle. It should be noted that at this stage the event identification system 10 is unaware of the events that the network flows 16 belong to. The circles, triangles and squares shown in FIG. 2 are used as an aid to understanding how individual flows 16 are analyzed and eventually events are identified from the network flows 16.

The processor 12 (FIG. 1) is operative to provide, by reading from the memory 14 (FIG. 1), flow-specific criteria for each of the event-types. For each event-type, the flow-specific criteria of that event-type is defined to identify if each of the network flows 16 potentially forms part of some event of that event-type when each of the network flows 16 is examined independently of all the other network flows 16 with respect to the flow-specific criteria of that event-type. The term "potentially form part", as used in the specification and the claims, is defined as a network flow 16 may or may not be determined to be part of an event of that event-type when finally analyzed at the second stage (the aggregation criteria stage), but at the first stage (the flow-specific criteria stage) the event identification system 10 is more inclusive, and attempts to include network flows 16 that could potentially be part of an event when analyzed at the second stage. The term "examined independently", as used in the specification and the claims, is defined as not requiring each of the network flows 16 to be compared to the flow-specific criteria as part of a group of one or more other network flows 16.

The flow-specific criteria for each event-type is typically defined by experts and imported into the event identification system 10.

The flow-specific criteria for an event-type may be defined to check any one or more of the following aspects of a network flow 16, by way of example only: a flag value of the network flow 16; a number of bytes of the network flow 16; a number of packets of the network flow 16.

The processor 12 (FIG. 1) is operative, for each event-type, to compare each network flow 16 to the flow-specific criteria of that event-type to determine if that network flow 16 satisfies the flow-specific criteria of that event-type (arrow 22).

For each event-type, for each network flow 16 satisfying the flow-specific criteria of that event-type, the processor 12 (FIG. 1) is operative to assign that network flow 16 to a proto-event 20 of that event-type. Each event-type may include one or more proto-events 20 so that as a group, the event-types include a plurality of proto-events 20. In the example of FIG. 2, event-type A includes at least two proto-events 20 as does event-type B whereas event-type C includes only one proto-event 20. The processor 12 is operative to determine, to which one of the proto-events 20 to assign each network flow 16. Assigning network flows 16 to the proto-events 20 is described in more detail with reference to FIGS. 3 and 4. It should be noted that some of the network flows 16 may be identified as being part of more than one proto-event 20 of different event types. However, it may also happen that none of the network flows 16 are identified as being part of more than one proto-event 20 of more than one event type. By way of example, in FIG. 2, one of the network flows 16 (labeled with a 2 in a square) has been identified as being part of proto-event 2 of event-type A, proto-event 2 of event-type B and proto-event 1 of event-type C.

The processor 12 (FIG. 1) is operative, for each proto-event 20, to create a data sub-set 24 including data from each network flow 16 that is to be assigned to that proto-event 20. The data from each network flow 16 included in the data sub-set 24 generally includes one or more of the following: a start time of each network flow 16, a duration of each network flow 16, a protocol of each network flow 16, a source-IP of each network flow 16, a source-Port of each network flow 16, a destination-IP of each network flow 16, a destination-Port of each network flow 16, flags of each network flow 16, a number of packets of each network flow 16, a number of bytes of each network flow 16, by way of example only.

The processor 12 (FIG. 1) is operative to store the data sub-set 24 for each proto-event 20 (FIG. 2) in the memory 14 (FIG. 1).

Figure 3:
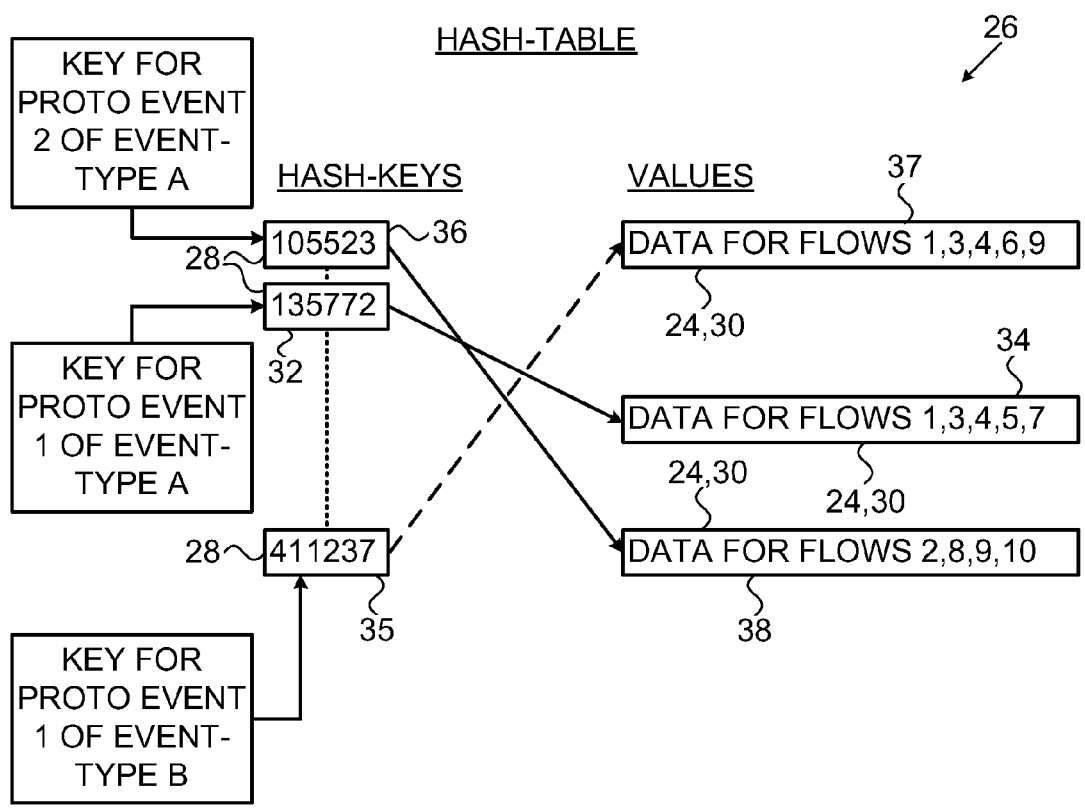
FIG. 3 is a partly pictorial, partly block diagram view of a hash-table for use in the system of FIG. 1.

Reference is now made to FIG. 3, which is a partly pictorial, partly block diagram view of a hash-table 26 for use in the system 10 of FIG. 1.

The data sub-sets 24 may be stored in any suitable data structure. The inventors have found a particularly efficient way to assign the network flows 16 (FIG. 2) to proto-events 20 (FIG. 2) and store the data in the data sub-sets 24 using hash-functions and a hash-table (also known as a hash-map) or similar data storage structure. The use of a hash-table is particularly useful in the first "flow-specific" criteria stage. It should be noted that non-hash functions may be used to assign the network flows 16 to the proto-events 20.

The use of the hash-functions is described in more detail with reference to FIG. 4.

The processor 12 (FIG. 1) is optionally operative to provide the hash-table 26 in the memory 14 (FIG. 1) and store the data sub-set 24 of each proto-event 20 (FIG. 2) in the hash-table 26.

FIG. 3 shows a plurality of hash-keys 28 and a plurality of corresponding data values 30. Each hash-key 28 corresponds to one of the data values 30. So for example, a hash-key 32 for proto-event 1 of event-type A corresponds to a value 34 for that proto-event of event-type A, the value 34 including data for network flows 1, 3, 4,5, 7. So for example, a hash-key 36 for proto-event 2 of event-type A corresponds to a value 38 for that proto-event of event-type A, the value 38 including data for network flows 2, 8, 9, 10. So for example, a hash-key 35 for proto-event 1 of event-type B corresponds to a value 37 for that proto-event of event-type B, the value 37 including data for network flows 1, 3, 4, 6, 9.

Figure 4:
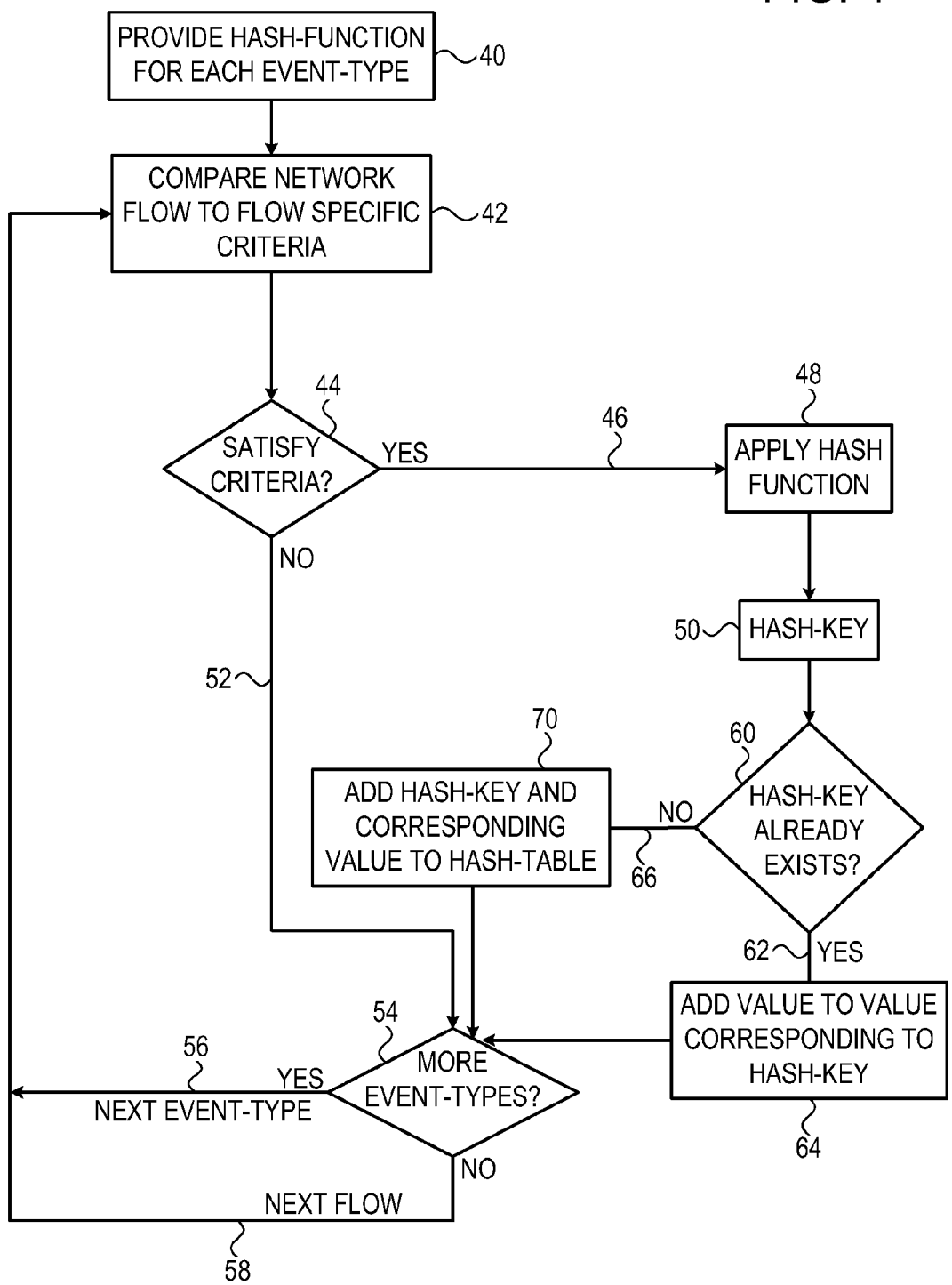
FIG. 4 is a flow chart showing a method of applying the flow-specific criteria of FIG. 2 and populating the hash-table of FIG. 3.

Reference is now made to FIG. 4, which is a flow chart showing a method of applying the flow-specific criteria of FIG. 2 and populating the hash-table 26 of FIG. 3.

The processor 12 (FIG. 1) is operative to provide a hash function for each event-type (block 40) from the memory 14 (FIG. 1). The hash function for an event-type maps data from each of the network flows 16 (FIG. 2) that are to be assigned to the same proto-event 20 (FIG. 2) of that event-type to a same hash-key 28 (FIG. 3). In other words, any of the network flows 16 that would be assigned to the same proto-event 20 of that event-type would yield the same hash-key 28 when the data from any of the networks flow 16 is inputted to the hash function for that proto-event 20 of that event-type. For example, a flow X for a proto-event 20 of event-type A would yield a hash key K and a flow Y for the same proto-event 20 of event-type A would yield the same hash key K. It will be appreciated that the hash function for each event-type is configured according to the data expected for each event-type and in such a manner to sort the network flows 16 in to the relevant proto-events 20. For example, two network flows 16 may satisfy the flow-specific criteria for event-type A which may be in the class of SSH cracking. One of the network flows 16 may be part of an SSH cracking event at node 1 and one of the network flows 16 may be part of an SSH cracking event at node 2. The hash function for event-type A is designed to assign the network flow 16 relevant to node 1 into proto-event 1 and the network flow 16 relevant to node 2 into proto-event 2. The data from a network flow 16 input to the hash function generally includes one or more of the following: a protocol of the network flow 16, a source-IP of the network flow 16, a source-Port of the network flow 16, a destination-IP of the network flow 16, a destination-Port of the network flow 16, flags of the network flow 16, a number of packets of the network flow 16 and a number of bytes of the network flow 16.

As will be described in more detail below, for each event-type and for each network flow F (FIG. 2) satisfying the flow-specific criteria of that event-type, the processor 12 (FIG. 1) is operative to determine a hash-key K of that network flow F using at least some of the data from that network flow F as input to the hash function for that event-type.

As already described above with reference to FIG. 2, the processor 12 (FIG. 1) is operative to compare a network flow F to the flow-specific criteria for an event-type (block 42) and determine whether the network flow F satisfies the flow-specific criteria for that event-type (decision block 44).

If the network flow F does not satisfy the flow-specific criteria for that event-type (branch 52), the processor 12 checks to determine whether there is a next event-type for the network flow F to be compared with the flow-specific criteria of the next event-type to determine whether the network flow F is potentially part of at least one event of the next event-type (decision block 54). If there is a next event-type (branch 56), the processing of the block 42 is repeated with this next event-type. If there is not a next event-type (branch 58), the processor repeats block 42 with the next network flow 16 (until there are no more network flows 16 to process in the time window under examination).

If the network flow F satisfies the flow-specific criteria for that event-type (branch 46) then the data from the network flow F is input to the hash-function for that event-type (block 48) yielding a hash key K (block 50).

The processor 12 (FIG. 1) checks whether the hash-key K already exists in the hash-table 26 (decision block 60). If the hash-key K already exists in the hash-table 26 (branch 62), the processor 12 (FIG. 1) is operative to add the data from network flow F to a value already existing in the hash-table 26 (i.e. an existing proto-event 20 (FIG. 2)) corresponding to the hash-key K (block 64) and then continue at decision block 54. The value already existing in the hash-table 26 corresponding to the hash-key K includes data from other network flows 16 of the same proto-event 20 as the network flow F. If the hash-key K does not already exist in the hash-table 26 (branch 66), the processor 12 is operative to add the hash-key K and a corresponding value including the data from the network flow F to the hash-table 26 (block 70) thereby creating a new proto-event 20 and then continue at decision block 54.

Each different key K and its associated value in the hash-table 26 represent a different proto-event 20 (FIG. 2).

Figure 5:
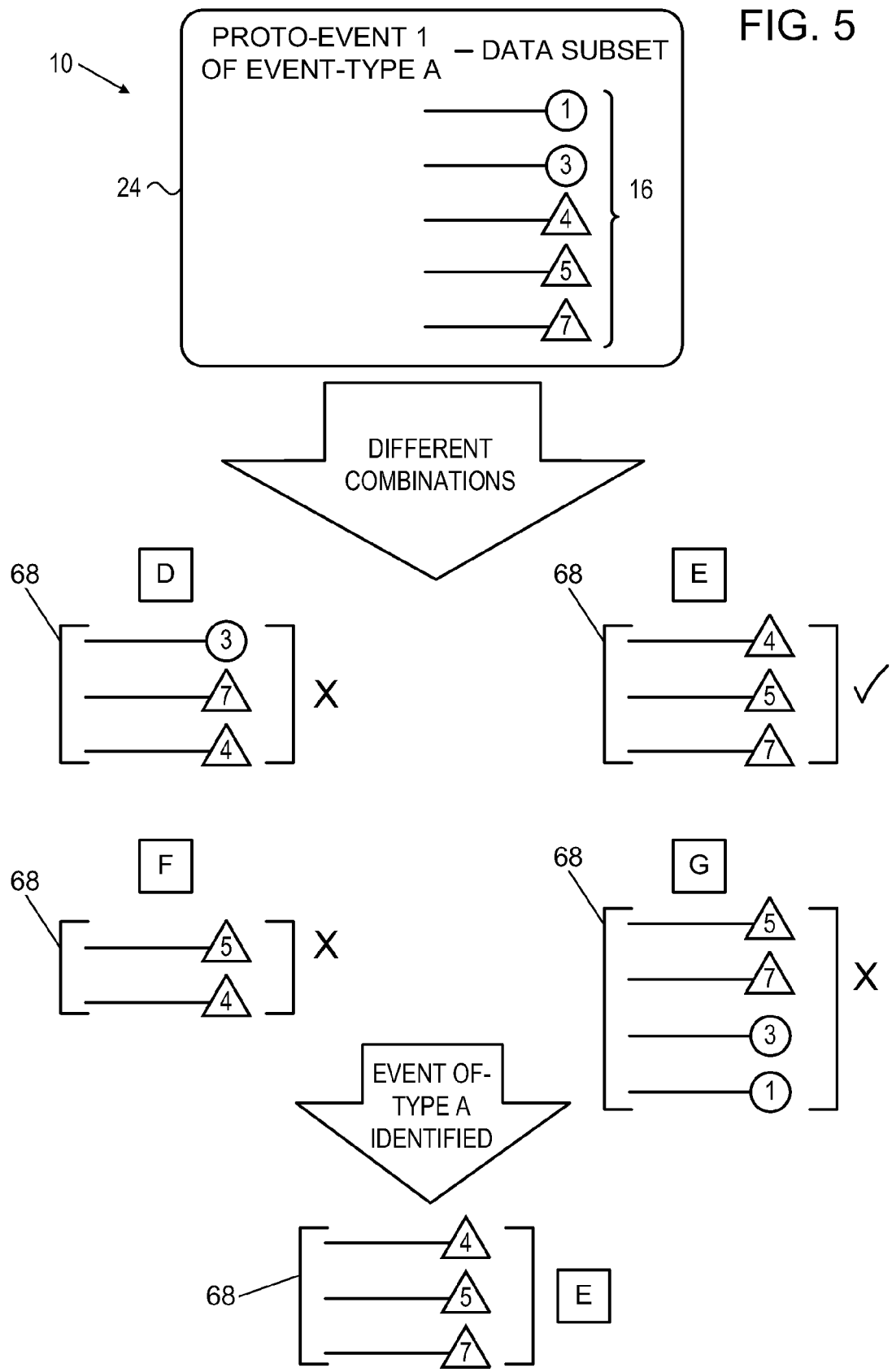
FIG. 5 is a partly pictorial, partly block diagram view showing application of an aggregation criteria in the system of FIG. 1.

Reference is now made to FIG. 5, which is a partly pictorial, partly block diagram view showing application of aggregation criteria in the system 10 of FIG. 1.

The aggregation criteria phase for all the proto-events 20 (FIG. 2) may be performed by the same processor 12. Alternatively, the processing for proto-events in this second stage may be divided among more than one processor.

The processor 12 (FIG. 1) is operative to provide, by reading from the memory 14 (FIG. 1), aggregation criteria for each event-type processed by the processor 12 (FIG. 1).

The aggregation criteria for an event-type is defined to identify an event in a proto-event 20 (FIG. 2) of that event-type from at least some of the networks flows 16 in the proto-event 20 of that event-type when the at least some network flows that form part of the proto-event 20 of that event-type are examined together as a group.

By way of example only, the aggregation criteria for an event-type may be defined to limit, one or more of the following: the maximum or minimum number of the network flows 16 in the event; the average number of bytes of the network flows 16 in the event; the average entropy of ports of the network flows 16 in the event; average number of bytes per packet; distance of entropy of destination ports from entropy of destination IPs and vice-versa, distance of entropy of source ports from entropy of source IPs and vice-versa; maximum number of packets/flows per destination/source IP/port (all combinations); numbers of unique ports, IPs.

The aggregation criteria for each event-type is typically defined by experts and imported into the event identification system 10. It may be possible that for some event-types, the flow-specific criteria or the aggregation criteria may not be specified thereby allowing all network flows to be included in a sub-set 24 (FIG. 2) or any combination 68 in a sub-set 24 (FIG. 2) to be defined as an event, respectively.

For each of the proto-events 20 (FIG. 2), to be processed by the processor 12 (FIG. 1) at the aggregation criteria phase, the processor 12 is operative to test different combinations 68 of the network flows 16 of that proto-event 20 against the aggregation criteria of the event-type of that proto-event 20 to determine if one of the different combinations 68 of the network flows 16 assigned to that proto-event 20 satisfies the aggregation criteria for the event-type of that proto-event 20 and identifies the event from among the network flows 16 of that proto-event 20. Once the combination 68 of the network flows 16 (of that proto-event 20) that satisfies the aggregation criteria for that event-type is found, the processor 12 generally does not need to test other different combinations 68 of the network flows 16 of that proto-event 20. In one embodiment, the subset search typically starts with the maximum set of flows within the proto-event 20, and iteratively tries to remove some network flows 16. Once the sub-search procedure finds a smaller set of flows satisfying all the aggregation criteria for the event-type, the search is generally complete, even though some smaller subsets of the actual set could also satisfy the aggregation criteria for the event-type.

The term "different combinations" as used in the specification and claims, is defined to include different sub-groups of the network flows 16 (in the data sub-set 24) in the proto-event being analyzed. So for example, in FIG. 5, a sub-group of the data sub-set 24 for the proto-event 1 of event-type A includes the network flows labeled 3, 7 and 4.

FIG. 5 shows the data sub-set 24 for proto-event 1 of event-type A including five network flows 16 (network flows labeled 1, 3, 4, 5 and 7). Different combinations of the five network flows are shown labeled D, E, F and G. Combinations D, F and G do not satisfy the aggregation criteria for event-type A, whereas combination E does satisfy the aggregation criteria for event-type A.

It should be noted that a proto-event 20 (FIG. 2) may or may not yield an event which satisfies the aggregation criteria for that proto-event 20 It should also be noted that for each event-type, zero, one or more events may be identified that satisfy the aggregation criteria.

Heuristics may be used to improve the processing speed of applying the aggregation criteria. The heuristics may be event-type specific.

An example of aggregation criteria and associated heuristics for an SSH cracking request event-type follows.

The event-type description may include at least the following aggregation criteria:
rangeAvgBytesPerFlow=500 . . . 4500
percentUniqBytes=0 . . . 50
bytesSimilarity=0 . . . 2

An example of a simple heuristic for the first criteria "rangeAvgBytesPerFlow" includes the following steps:
  (a) start with the whole set of network flows in the proto-event 20 (FIG. 2);
  (b) order the network flows according to size (number of bytes);
  (c) check if the average size falls within the given range;
  (d) if not, remove the network flow that is furthest from the range in the direction of the overall average;
  (e) update the average (simply in constant time); and
  (e) repeat from step (c).

An example of aggregation criteria and associated heuristics for a p2p_like_tcp_requests event-type follows.

The event-type description may include at least the following aggregation criteria:
  rangeAvgBytesPerFlow'0 . . . 20000
  entropyOfDstIPs=entropyOfDstPrt<3>
  bytesSimilarity=0 . . . 2

An example of a more complex heuristic for entropyOfDstIPs=entropyOfDstPrt<3> includes the following steps:
  (a) arrange buckets for all destIPs and destPorts and assign flows in to the buckets accordingly;
  (b) calculate the entropy of destIPs and destPorts from the buckets;
  (c) check if the difference between the calculated entropies is less than 3;
  (d) if not, for each flow, calculate what entropy difference would be induced by the removal of that flow (this can be calculated in constant time/flow, if derived properly from the entropy formula);
  (e) order the flows according to the new measure of entropy difference after removal, termed "ED";
  (f) remove the flow that will cause the entropy difference to decrease the most (having the lowest ED);
  (g) update the overall entropies and the difference (constant time);
  (h) for each flow sharing a bucket (either destIP or destPort bucket) with the removed flow, update the EDs of each flow (performed in linear time in the size of buckets, update of a flow's ED is in constant time as stated above); and
  (i) repeat from step (c).

Figure 6:
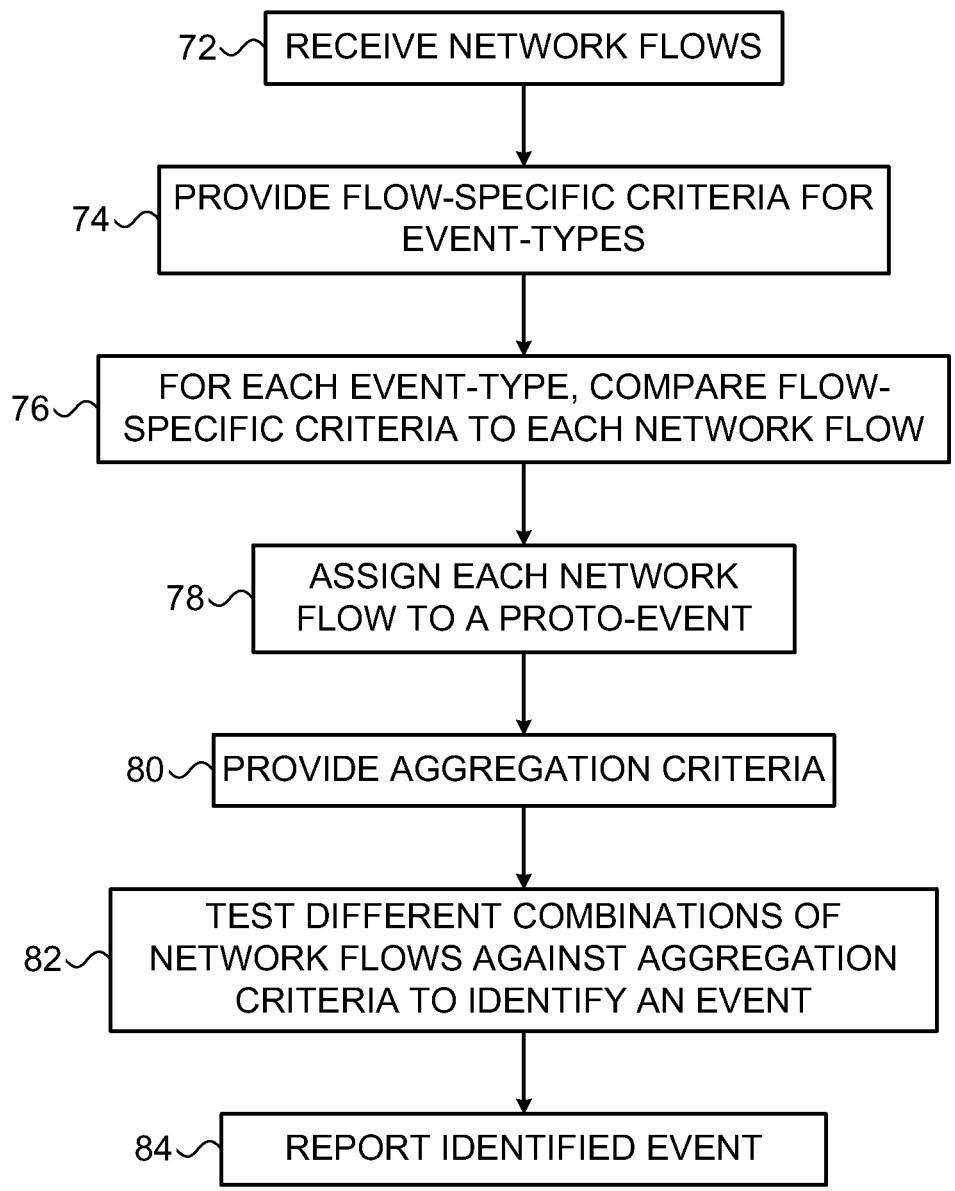
FIG. 6 is a flow chart showing a method of identifying an event from network flows and reporting the event in the system of FIG. 1.

FIG. 6 shows a flow chart showing a method of identifying an event (FIG. 2) from the network flows 16 and reporting the event in the system 10 of FIG. 1. FIG. 6 lists the following steps from the method:
  (a) receive network flows (block 72);
  (b) provide flow-specific criteria for event-types (block 74);
  (c) for each event-type, compare flow-specific criteria to each network flow (block 76);
  (d) assign each network flow to a proto-event (block 78);
  (e) provide aggregation criteria (block 80);
  (f) test different combinations of network flows against aggregation criteria to identify an event (block 82); and
  (g) report identified event (block 84).

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A system comprising a hardware processor; and a memory to store data used by the hardware processor, wherein the hardware processor is operative to:
  receive a plurality of network flows from a network;
  read, from the memory, a flow-specific criteria for each one event-type of a plurality of event-types, wherein for each one event-type of the plurality of event-types, the flow-specific criteria of the one event-type is defined to identify if each one network flow of the plurality of network flows potentially forms part of one or more events of the one event-type when each one network flow of the plurality of network flows is examined independently of all other ones of the plurality of network flows with respect to the flow-specific criteria of the one event-type;
  for each one event-type of the plurality of event-types, compare each one network flow of the plurality of network flows to the flow-specific criteria of the one event-type to determine if the one network flow satisfies the flow-specific criteria of the one event-type;
  for each one event-type of the plurality of event-types, for each one network flow of the plurality of network flows satisfying the flow-specific criteria of the one event-type, assign the one network flow satisfying the flow-specific criteria of the one event-type to a proto-event of the one-event type, the proto-event being assigned at least two network flows of the plurality of network flows, wherein the plurality of event-types includes a plurality of proto-events, each one event-type of the plurality of event-types including at least one proto-event;
  read, from the memory, an aggregation criteria for one of the event-types, wherein the aggregation criteria is defined to identify an event in the proto-event of the one event-type from the at least two networks flows in the proto-event of the one event-type when the at least two network flows that form part of the proto-event of the one event-type are examined together as a group; and
  test different combinations of the at least two network flows assigned to the proto-event of the one event-type against the aggregation criteria of the one event-type to determine if one combination of the different combinations of the at least two network flows assigned to the proto-event of the one event-type satisfies the aggregation criteria for the one event-type and identifies an event of the one event-type from among the at least two network flows of the proto-event.

2. The system according to claim 1, wherein the hardware processor is operative to determine, to which one of the plurality of proto-events to assign the one network flow satisfying the flow-specific criteria of the one event-type.

3. The system according to claim 1, wherein at least two network flows of the plurality of network flows will be determined as being part of more than one of the plurality of proto-events of different ones of the plurality of event-types.

4. The system according to claim 1, wherein for each one proto-event of the proto-events, the processor is operative to test the different combinations of the at least two network flows assigned to the one proto-event against the aggregation criteria of the one event-types of the one proto-event to determine if one of the different combinations of the at least two network flows assigned to the one proto-event satisfies the aggregation criteria for the one event-type of the one proto-event and identifies the event of the one event-type from among the at least two network flows of the one proto-event.

5. The system accord to claim 1, wherein the flow-specific criteria is defined to check a protocol of one the plurality of network flows.

6. The system according to claim 1, wherein the flow-specific criteria is defined to check a flag value of one of the plurality of network flows.

7. The system according to claim 1, wherein the flow-specific criteria is defined to check a number of bytes of one of the plurality of network flows.

8. The system according to claim 1, wherein the flow-specific criteria is defined to check a number of packets of one of the plurality of network flows.

9. The system according to claim 1, wherein the aggregation criteria is defined to limit a maximum or minimum number of the plurality of network flows in the event of the one event-type.

10. The system according to claim 1, wherein the aggregation criteria is defined to limit an average number of bytes of the plurality of network flows in the event of the one event-type.

11. The system according to claim 1, wherein the aggregation criteria is defined to limit an average entropy of ports of the plurality of network flows in the event of the one event-type.

12. The system according to claim 1, wherein the hardware processor is operative, for each one proto-event of the plurality of proto-events, to:
create a data sub-set including data from each one network flow of the plurality of network flows that are to be assigned to the one proto-event; and
store the data sub-set of the one proto-event in the memory.

13. The system according to claim 12, wherein the hardware processor is operative to:
provide a hash-table in the memory; and
store the data sub-set of the one proto-event in the hash-table.

14. The system according to claim 12, wherein the hardware processor is operative to:
provide a hash function for each one event-type of the plurality of event-types, the hash function for the one event-type mapping the data from each one network flow of the plurality of network flows that are to be assigned to a same one of the plurality of proto-events to a same hash-key; and
for each one event-type of the plurality of event-types, for each one network flow of the plurality of network flows satisfying the flow-specific criteria of the one event-type, determine a first hash-key of the one network flow satisfying the flow-specific criteria of the one event-type using a part, or all, of the data from the one network flow satisfying the flow-specific criteria of the one event-type as input to the hash function for the one event-type, wherein: if the first hash-key already exists in the hash-table, the hardware processor is operative to add the data from the one network flow satisfying the flow-specific criteria of the one event-type to a value in the hash-table corresponding to the first hash-key; and if the first hash-key does not already exist in the hash-table, the hardware processor is operative to add the hash-key and a corresponding value including the data from the one network flow satisfying the flow-specific criteria of the one event-type to the hash-table.

15. The system according to claim 14, wherein the data from the one network flow satisfying the flow-specific criteria of the one event-type includes one or more of the following: a protocol of the one network flow satisfying the flow-specific criteria of the one event-type, a source-IP of the one network flow satisfying the flow-specific criteria of the one event-type, a source-Port of the one network flow satisfying the flow-specific criteria of the one event-type, a destination-IP of the one network flow satisfying the flow-specific criteria of the one event-type, a destination-Port of the one network flow satisfying the flow-specific criteria of the one event-type, flags of the one network flow satisfying the flow-specific criteria of the one event-type, a number of packets of the one network flow satisfying the flow-specific criteria of the one event-type, a number of bytes of the one network flow satisfying the flow-specific criteria of the one event-type.

16. A method comprising:
receiving a plurality of network flows from a network;
reading, from a memory, a flow-specific criteria for each one event-type of a plurality of event-types, wherein for each one event-type of the plurality event-types, the flow-specific criteria of the one event-type is defined to identify if each one network flow of the plurality network flows potentially forms part of one or more events of the one event-type when each one network flow of the plurality of network flows is examined independently of all other ones of the plurality of network flows with respect to the flow-specific criteria of the one event-type;
for each one event-type of the plurality of event-types, comparing each one network flow of the plurality of network flows to the flow-specific criteria of the one event-type to determine if the one network flow satisfies the flow-specific criteria of the one event-type;
for each one event-type of the plurality of event-types, for each one network flow of the plurality of network flows satisfying the flow-specific criteria of the one event-type, assigning the one network flow satisfying the flow-specific criteria of the one event-type to a proto-event of the one-event type, the proto-event being assigned at least two network flows of the plurality of network flows, wherein the plurality of event-types includes a plurality of proto-events, each one event-type of the plurality of event-types including at least one proto-event;
reading, from the memory, an aggregation criteria for one of the event-types, wherein the aggregation criteria is defined to identify an event in the proto-event of the one event-type from the at least two networks flows in the proto-event of the one event-type when the at least two network flows that form part of the proto-event of the one event-type are examined together as a group; and testing different combinations of the at least two network flows assigned to the proto-event of the one event-type against the aggregation criteria of the one event-type to determine if one combination of the different combinations of the at least two network flows assigned to the proto-event of the one event-type satisfies the aggregation criteria for the one event-type and identifies an event of the one event-type from among the at least two network flows of the proto-event.

17. The method according to claim 16, further comprising outputting a report of the event of the one event-type identified from the plurality of network flows.

18. The method according to claim 16, further comprising:
providing a hash function for each one event-type of the plurality of event-types, the hash function for the one event-type mapping the data from each one network flow of the network flows that are to be assigned to a same one of the plurality of proto-events to a same hash-key; and for each one event-type of the plurality of event-types, for each one network flow of the plurality of network flows satisfying the flow-specific criteria of the one event-type, determining a first hash-key of the one network flow satisfying the flow-specific criteria of the one event-type using a part, or all, of the data from the one network flow satisfying the flow-specific criteria of the one event-type as input to the hash function for the one event-type;

if the first hash-key already exists in the hash-table, adding the data from the one network flow satisfying the flow-specific criteria of the one event-type to a value in the hash-table corresponding to the first hash-key; and if the first hash-key does not already exist in the hash-table, adding the hash-key and a corresponding value including the data from the one network flow satisfying the flow-specific criteria of the one event-type to the hash-table.

19. A system comprising a hardware processor; and a memory to store data used by the hardware processor, wherein the hardware processor is operative to:
receive a plurality of network flows from a network;
read, from the memory, a flow-specific criteria for each one event-type of a plurality of event-types, wherein for each one event-type of the plurality of event-types, the flow-specific criteria of the one event-type is defined to identify if each one network flow of the plurality of network flows potentially forms part of one or more events of the one event-type when each one network flow of the plurality of network flows is examined independently of all other ones of the plurality of network flows with respect to the flow-specific criteria of the one event-type;

for each one event-type of the plurality of event-types, compare each one network flow of the plurality of network flows to the flow-specific criteria of the one event-type to determine if the one network flow satisfies the flow-specific criteria of the one event-type;

for each one event-type of the plurality of event-types, for each one network flow of the plurality of network flows satisfying the flow-specific criteria of the one event-type, assign the one network flow satisfying the flow-specific criteria of the one event-type to a proto-event of the one-event type, the proto-event being assigned at least two network flows of the plurality of network flows, wherein the plurality of event-types includes a plurality of proto-events, each one event-type of the plurality of event-types including at least one proto-event;

read, from the memory, an aggregation criteria for one of the event-types, wherein the aggregation criteria is defined to identify an event in the proto-event of the one event-type from the at least two networks flows in the proto-event of the one event-type when the at least two network flows that form part of the proto-event of the one event-type are examined together as a group;

test different combinations of the at least two network flows assigned to the proto-event of the one event-type against the aggregation criteria of the one event-type to determine if one combination of the different combinations of the at least two network flows assigned to the proto-event of the one event-type satisfies the aggregation criteria for the one event-type and identifies an event of the one event-type from among the at least two network flows of the proto-event; and identify a suspicious event based on applying the flow-specific criteria and the aggregation criteria for at least one event-type of the plurality of event-types.

20. The system according to claim 19, wherein the processor is operative to output a report of the event of the one event-type identified from the plurality of network flows.

* * * * *